May 3, 1938.                F. M. EATON                2,115,946
                     FILLER FOR GAS MASK CANISTERS
                         Filed April 25, 1936

INVENTOR.
FREDERICK M. EATON
BY Charles S. Evans
HIS ATTORNEY.

Patented May 3, 1938

2,115,946

UNITED STATES PATENT OFFICE 2,115,946

FILLER FOR GAS MASK CANISTERS

Frederick M. Eaton, Carson City, Nev., assignor to E. D. Bullard Company, San Francisco, Calif., a corporation of California Application April 25, 1936, Serial No. 76,416

9 Claims. (Cl. 252—2.5)

My invention relates to canisters and canister fillers for use with gas masks, and similar equipment, for removing impurities from air to render the air suitable for breathing.

Among the objects of my inventions is the provision of an improved canister and filler having superior effectiveness for removing obnoxious components from air.

Other objects of my invention include the provision of an improved canister filler which is inherently porous and resilient; and which will present substantially uniform low resistance throughout to the passage of air therethrough, and at the same time obtain a maximum exposure of the air to the impurity-removing medium of the filler.

Another object is to provide a filler in which a chemical medium is retained in a condition favorable to a rapid and complete reaction with an impurity to be removed from air passing therethrough.

Another object is to provide a filler which is particularly suited for the removal of ammonia from ammonia-laden air.

Another object is the provision of a filler which may be manufactured and used economically.

A further object is to provide an improved method of preparing canister filler material; and for removing impurities from air.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing.

Figure 1:
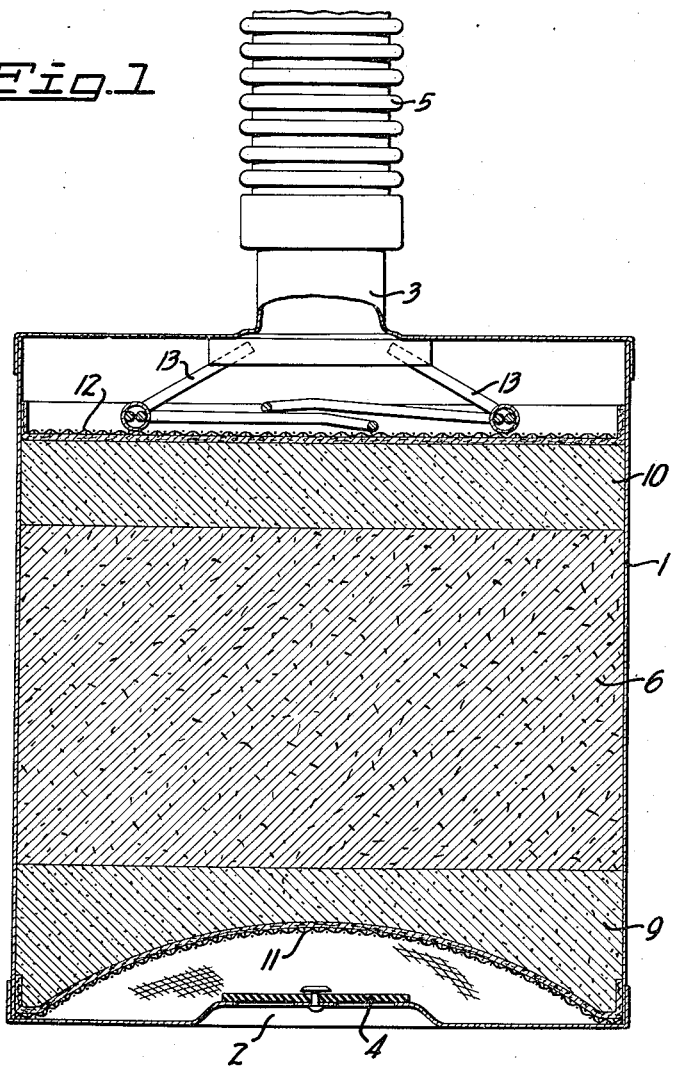
Figure 1 is a vertical section of a canister and filler embodying my invention.

In terms of broad inclusion, my invention comprises a canister of any suitable size and form through which air may be passed to condition it for breathing, a filler being provided for removing objectionable impurities in the air. The filler preferably comprises a purifying layer of grain hulls, the hollows of which contain a damp paste formed by wetting a pulverulent material, such as grain hull ash, with a liquid reagent capable of reacting with the impurities to be removed from the air. The invention also contemplates a humidifying layer for moistening air entering the canister; and a dehydrating layer for removing excess moisture from air leaving the canister.

In terms of greater detail, the canister of my invention comprises a suitable container 1, having an air inlet 2 and an outlet 3. The inlet 2 is preferably positioned in the bottom of the container, and is provided with a suitable check valve 4 to prevent the outward passage of air through the inlet. The outlet 3 is preferably positioned in the top of the container, and is arranged to receive the usual hose connection 5 of a gas mask.

Within the container 1 is placed a filler for removing impurities, such as obnoxious gases, from air passed through the canister. The filler comprises an impurity removing layer 6 of light, porous, and resilient material carrying a chemical reagent capable of reacting with whatever impurity is to be removed from the air.

I have discovered that grain hulls, as for example the hulls of rice, oats, or other grains or grain-like seeds, are especially suited for use as a carrier for the active chemical medium. Such hulls are cup-like in shape, and are of a firm and resilient character such that the hulls tend to retain their natural shape and will sustain a substantial amount of pressure without crushing. In mass, the hulls produce a porous body possessing a high degree of resilience.

In the hollows of the hulls is carried a paste formed by wetting a pulverulent material with a liquid reagent possessing desired chemical properties. For this purpose, I have found that grain hull ash constitutes an efficient and economical pulverulent material. Other light powdery material capable of absorbing and retaining an effective amount of the desired chemical reagent may be used in place of the grain hull ash. For example, infusorial earth, or any organic or inorganic powder, inert to the chemical reagent selected and capable of forming a mud-like paste when wet with the agent, will serve the purpose. The term reagent is here used to include an active substance which is itself a liquid or which is carried in liquid solution in water or other liquid solvent.

The filler is preferably prepared by introducing a measured quantity of grain hulls into a container, and adding a calculated amount of the liquid chemical reagent to be used. The mixture is agitated until the hulls are thoroughly wetted. A sufficient quantity of pulverulent material is then added to take up the liquid and form therewith a mud-like paste.

The mixture is then agitated, preferably by rolling the mixture in a drum, until the paste is uniformly distributed through the wet mass of hulls.

Figure 2:
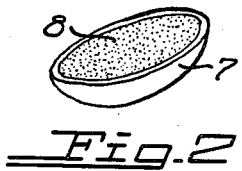
Figure 2 is an enlarged view of a granule of the filler material.
Figure 3:
Figure 3 is an enlarged transverse section of a granule of the filler material.

The grain hulls have the property of collecting the paste in the hollows of the hulls. As the mixture is agitated, the paste is deposited in the cup-like hollows of the hull, so that each hull carries a small filling of the paste. This is illustrated on an enlarged scale in Figures 2 and 3 of the drawing, wherein 7 represents a grain hull, and 8 represents the paste filling carried in the hollow cup of the hull.

The chemical reagent is selected in accordance with the impurity to be removed from the air. For example, in purifying ammonia-laden air to render it suitable for breathing, a reagent is selected which will react with the ammonia to produce a stable compound. For that purpose, I prefer to use a solution of nickel chloride ($NiCl_2$). Copper chloride, or cobalt chloride may be substituted for the nickel chloride. The sulphates and other salts of nickel, copper, cobalt, iron, or other metals, having an affinity for ammonia, may also be substituted for the nickel chloride. The property of the various salts of this general class to react with and take up ammonia from ammonia-laden air is well known to chemists, and the selection of a particular reagent is largely a matter of availability and cost.

Other obnoxious impurities may be removed in a similar manner by the use of a chemical reagent of suitable character to react with a particular impurity. The properties of the various chemical reagents in that regard are well known to chemists and require no detailed explanation herein.

The following proportions have been found to produce a highly satisfactory filler for removing ammonia from air:

Rice hulls _____ 75 grams
Saturated solution of nickel chloride___ 90 cc.
Rice hull ash_____ 75 grams
Water_____ 20 cc.

The above amounts produce a quantity of filler sufficient for use in a small-type canister having a capacity of approximately 600 cc. The filler does not give off any objectionable fumes, nor is an objectionable amount of heat generated when the filler is in use.

The impurity removing layer 6 is preferably positioned between a humidifying layer 9 adjacent the inlet 2, and a dehydrating layer 10 adjacent the outlet 3 of the canister.

The layer 9 is preferably formed of grain hulls carrying in the hollows thereof a wet paste formed from pulverulent material and water. The material for the layer 9 is prepared in substantially the same manner as the material for the layer 6 except that the purefying chemical is omitted. The following proportions produce a filler material of suitable character for use as a humidifying layer:

Rice hulls _____ 10 grams
Rice hull ash_____ 10 grams
Water_____ 25 cc.

The mixture is agitated and rolled as above described to distribute the paste of rice hull ash and water in the hollows of the hulls. The amounts noted will produce a sufficient quantity of material for a small size canister such as above referred to. The proportions may be varied through a comparatively wide range; and equivalent carriers and pulverulent materials may be substituted for the rice hulls and rice hull ash respectively, if desired.

The dehydrating layer 10 may be suitably formed from 15 grams of rice rulls and 25 grams of glycerine mixed to distribute the glycerine uniformly through the mass of hulls. Any dehydrating material capable of absorbing moisture from air passing therethrough may be substituted for the glycerine. Rice hull ash or other pulverulent material may be added to aid in holding the dehydrating material in the hollows of the hulls if desired.

The layers 6, 9, and 10 are preferably retained in the canister 1 between bottom and top screens 11 and 12, respectively. The bottom screen 11 is preferably arched to assure free action of the intake valve 4. The upper screen is preferably held firmly against the top of the upper filler layer 10 by suitable springs 13. Both screens are preferably faced with felt to prevent any sifting of the filler contents through the screens. The felt facing of the lower screen may be moistened with water to aid in humidifying the air passing into the canister; and the felt facing of the upper screen may be moistened with glycerine to aid in removing excess moisture from air leaving the canister.

The filler layers 6, 9, and 10, are placed in the canister in the order above noted, and are pressed into place with a pressure preferably of about 20–25 pounds. Such pressure serves to compress the filler into a compact body. The shape, resilience, and other physical characteristics of the hulls cause the compressed mass to remain porous, so that comparatively little resistance is offered to the passage of air through the mass. The natural resilience of the hulls causes each hull to press against its neighbors in such a way as to prevent the formation of low resistance channels through the mass. As a result, the resistance to the passage of air is substantially uniform throughout the body of the filler. Air drawn through the canister and filler must make its way by a devious route through the small voids between the hulls; and is exposed to direct contact with the active medium carried in the hollows of the hulls over a very large area.

Because of the natural physical characteristics of rice hulls, including the natural firm resilience of the hull and its lightness and small cup-like shape, the use of such hulls as a carrier has been found to be superior to the use of sawdust, charcoal, and similar relatively heavy and non-resilient carriers heretofore used in the preparation of gas mask fillers. In addition, the hulls have heretofore been a waste product, and both the hulls and the ash resulting from the burning of the hulls as a waste product, are available at an extremely low cost.

The resilience of the hulls not only insures a porous mass which presents uniform low resistance to the passage of air therethrough, but in addition permits a material expansion of the mass due to the heat when the filler is in use without appreciably increasing the resistance to the passage of air.

The active chemical reagent for purifying the air is present in the liquid component of the paste, the pulverulent material serving merely to give sufficient body to hold the liquid in the hollows of the rice hull carriers. Hence, the chemical reagent is retained in a liquid condition which is particularly favorable for reacting with impurities, and for effecting a rapid and complete removal thereof from air passed through the canister.

The filler is preferably prepared cold, and may be inserted in the canister container immediately after the filler material is prepared. The humidifying layer 9, and the dehydrating layer 10 protect the purifying layer 6 from exposure to the atmosphere when the canister is not in use, and serve to prevent the drying out of the purifying layer. The moist filler may be kept indefinitely without material loss in effectiveness.

In operation, the canister is connected to the hose of a gas mask in the ordinary manner. Air entering the canister through the inlet 3 first passes through the humidifying layer 9 where it takes up moisture from the wet paste therein. The moisture so taken up fosters the reaction of the impurities with the active chemical reagent carried by the layer 6.

As the air is drawn through the layer 6, it is forced to make its way through the interstices of the mass, and is exposed to contact with the chemical reagent carried by the paste contained in the hollows of the carrier hulls. The liquid chemical reagent readily reacts with the impurities for which it has an affinity; and by the time the air has made its way through the layer 6, the chemical reagent will have reacted with the impurity of the air so as to effect a substantially complete removal of the impurities.

Excess moisture carried by the air, either by reason of the humidifying action of the layers 9 and 6, or as a reaction product resulting from the combining of the chemical reagent and the impurities, is absorbed by the dehydrating layer 10 as the air is passed therethrough. As a result, the air leaving the canister is purified and dried to condition it for breathing.

The active purifying reagent remains in liquid form or solution at all times while the canister is in use, and hence the filler may be used until substantially all of the chemical reagent carried by the filler has been consumed by the reaction with the impurities to be removed from the air. The filler of my invention therefore gives a period of usefulness which is the maximum for the quantity of active reagent included in the filler. When the active reagent is exhausted, the canister is opened and a fresh filler may be inserted. The size of the canister and the quantity of filler therein may of course be varied to suit the requirements of the particular service for which it is intended.

I claim:

1. A filler for gas mask canisters comprising grain hulls the hollows of which contain a filling of pulverulent material moistened to paste-like consistency with a liquid chemical reagent having the property of reacting with an impurity to be removed from air passed through the filler, the liquid being retained by the pulverulent material in globules supported by the hulls for providing a porous resilient body containing the reagent in active liquid condition.

2. A filler for gas mask canisters comprising grain hulls the hollows of which contain a filling of pulverulent material moistened to paste-like consistency with a liquid reagent having the property of reacting with ammonia, the liquid being retained by the pulverulent material in globules supported by the hulls for providing a porous resilient body containing the reagent in active liquid condition.

3. A filler for gas mask canisters comprising grain hulls the hollows of which contain a filling of grain hull ash moistened to paste-like consistency with a liquid chemical reagent having the property of reacting with an impurity to be removed from air passed through the filler, the liquid reagent being retained by the ash in globules supported by the hulls for providing a porous resilient body containing the reagent in active liquid condition.

4. A filler for gas mask canisters comprising grain hulls the hollows of which contain a filling of grain hull ash moistened to paste-like consistency with a liquid reagent having the property of reacting with ammonia, the liquid reagent being retained by the ash in globules supported by the hulls for providing a porous resilient body containing the reagent in active liquid condition.

5. A filler for gas mask canisters comprising rice hulls, and a filling of rice hull ash moistened to a paste-like consistency with a solution of a chemical reagent adapted to react with an impurity to be removed from air passed through the filler, the filling being deposited in the hollows of the hulls in globules supported by the hulls for providing a porous resilient body containing the solution in active liquid condition.

6. A filler for gas mask canisters comprising grain hulls, and a paste formed of pulverulent material and a solution of a metal salt capable of reaction with ammonia to remove the same from air, the paste being deposited in globules in the hollows of the grain hulls, and being supported thereby for providing a porous resilient body containing the solution in active liquid condition.

7. A filler for gas mask canisters comprising a hydrating layer for moistening air entering the canister, an absorbing layer comprising grain hulls the hollows of which contain globules of a paste formed of pulverulent material and a liquid chemical reagent adapted to react with an impurity in the air, the globules being supported by the hulls for providing a porous resilient body containing the solution in active liquid condition, and a dehydrating layer for removing moisture from the air after passing through the absorbing layer.

8. A filler for gas mask canisters comprising grain hulls the hollows of which contain a paste formed of grain hull ash and a solution of nickel chloride.

9. A filler for gas mask canisters comprising grain hulls, globules of wet paste deposited in the hollows of the hulls, the paste comprising pulverulent material and a solution of a salt having the property of reacting with ammonia and being supported by the hulls in a porous resilient body.

FREDERICK M. EATON.